Oct. 23, 1956

N. B. COLEY

2,768,335

RELAY BINARY COUNTER

Filed Dec. 31, 1952

INVENTOR.
N. B. COLEY
BY
Forest B. Hitchcock
HIS ATTORNEY

Oct. 23, 1956  N. B. COLEY  2,768,335
RELAY BINARY COUNTER
Filed Dec. 31, 1952  5 Sheets-Sheet 2

Fig. 2.

CODE CHART

| CR | COUNTING RELAYS | | | | | | STEP NO. |
|---|---|---|---|---|---|---|---|
| | 1 | 2 | 3 | 4 | 5 | 6 | |
| | ↑ | ↓ | ↓ | ↓ | ↓ | ↓ | ↓ | 1 |
| | ↓ | ↑ | ↓ | ↓ | ↓ | ↓ | ↓ | 2 |
| | ↑ | ↑ | ↓ | ↓ | ↓ | ↓ | ↓ | 3 |
| ... (steps 1–32) |

| CR | COUNTING RELAYS | | | | | | STEP NO. |
|---|---|---|---|---|---|---|---|
| | 1 | 2 | 3 | 4 | 5 | 6 | |
| ... (steps 33–64) |

NOTE:
NORMAL POSITION OF RELAYS CORRESPONDS TO STEP NO. 64

↑ = RELAY PICKED UP
↓ = RELAY DROPPED AWAY

*INVENTOR.*
N.B. COLEY
BY
*Forest B. Hitchcock*
HIS ATTORNEY

Oct. 23, 1956

N. B. COLEY 2,768,335

RELAY BINARY COUNTER

Filed Dec. 31, 1952

INVENTOR.
N.B. COLEY
BY
Forest B. Hitchcock
HIS ATTORNEY

Oct. 23, 1956

N. B. COLEY

2,768,335

RELAY BINARY COUNTER

Filed Dec. 31, 1952

INVENTOR.
N. B. COLEY
BY
Forest B. Hitchcock
HIS ATTORNEY

Fig.5.

United States Patent Office 2,768,335
Patented Oct. 23, 1956

2,768,335

RELAY BINARY COUNTER

Nelson B. Coley, Rochester, N. Y., assignor to General Railway Signal Company, Rochester, N. Y.

Application December 31, 1952, Serial No. 328,895

16 Claims. (Cl. 317—140)

This invention relates to a binary counting organization, and more particularly pertains to a relay binary counter which requires operation of only a single relay between successive inputs to the counter.

A relay counter of the binary type offers the advantage of being able to count a relatively large number of counts in proportion to the number of relays required. Binary counters in common use generally comprise a plurality of cascade-connected input dividing stages, all of which are generally similar and provide a single output for each second input. Such binary counters have the inherent disadvantage that different numbers of the stages must be operated in succession on different counts. The first stage responds to each input to be counted, the second to alternate inputs, the third to every fourth input, and so on. Thus, on the fourth input all the first three stages must be actuated in succession; whereas, in response to the fifth input only the first stage is operated. This means that varying times must elapse after an input is received before the count is properly registered.

In pulse or code communication circuits employing such a relay binary counter where distinctive channel circuits are to be rapidly established in accordance with the number of received counts, a varying and indeterminate time must elapse following each input before the next channel circuit is closed, thereby often creating a difficult timing problem. In the binary counter of this invention, this objection is overcome by causing only a single digital change for each input, and thus only a single relay operation to take place between successive inputs. In this way, the operating time of only one relay is involved following the reception of any input before the corresponding channel circuit is established.

Binary counters of the kind which employ cascade-connected input dividing stages commonly employ a pair of relays in each such stage. A binary counter of this type capable of counting $(2^n-1)$ inputs therefore requires $(2n)$ relays. In accordance with the principles of this invention, a binary counter capable of counting the same number of identical inputs need include only $(n+1)$ relays, resulting in a decided economy of apparatus. Thus, to have a capacity for counting sixty-three identical inputs, the binary counter of this invention need include only seven counting relays; whereas, the binary counters of the prior art which comprise cascade-connected pulse-halving circuits require twelve counting relays.

Described briefly, the relay binary counter of this invention comprises a plurality of relays which follow an operational sequence or binary code with one relay being provided for each digit of such code. This binary code is characterized by the distinctive feature that there is a change in only a single digit in its step-by-step progression. The counter inputs are not all applied to the first stage of the counter as is commony done in the counters of the prior art, but are instead selectively applied, according to the then existing condition of the counter, directly to the particular relay to be operated to cause its selective pick-up or release.

It is, therefore, an object of this invention to provide a relay binary counting circuit organization wherein only a single digital change involving operation of only a single relay is required between successive inputs.

Another object of this invention is to provide a relay binary counter organization which requires a minimum number of relays in proportion to its counting capacity.

An additional object of this invention is to provide a relay binary counter of the type wherein operation of only a single relay takes place between successive inputs and which employs neutral relays operated between their opposite positions by being energized to a picked-up condition and then released at the proper times through the opening of their holding or stick circuits.

Still another object of this invention is to provide a relay binary counter of the type wherein operation of only a single relay takes place between successive inputs employing neutral relays which are operated between their opposite conditions by being selectively energized with different polarities of direct current.

Another object of this invention is to provide a relay binary counter of the single-digit-change type which employs relays of the magnetic stick type operated between their opposite conditions by being selectively energized with different polarities of direct current.

An additional object of this invention is to provide a relay binary counter of the single-digit-change type employing neutral relays each having two windings, one being effective upon its energization to pick up said relay and to hold said relay in that condition and the other being effective upon being energized to cause the relay to drop away.

Other objects, purposes, and characteristic features of this invention will in part be obvious from the accompanying drawings and in part pointed out as the description of this invention progresses.

In describing this invention in detail, reference will be made to the accompanying drawings in which.

To simplify the illustration and facilitate the explanation of this invention, the parts and circuits which constitute the embodiment of this invention have been shown diagrammatically. Certain conventional illustrations have been used, and the drawings have been made to make it easy to understand the principles and manner of operation rather than to illustrate the specific construction and arrangement of parts that might be used in practice. The various relays and their contacts are illustrated in a conventional manner, and symbols are used to indicate connections to the terminals of a battery or other source of current instead of showing all of the wiring connections to these terminals.

The symbols (+) and (—) are employed to indicate the positive and negative terminals respectively of suitable batteries, or other sources of direct current; and the circuits with which these symbols are used, always have current flowing in the same direction. The symbols (B+) and (B—) indicate connections to the opposite terminals of a suitable battery, or other direct current source which has a central or intermediate tap designated (C); and the circuits with which these symbols are used, may have current flowing in one direction or the other depending upon the particular terminal used in combination with the intermediate tap (C).

It is well-known in the art that a binary counting device utilizing electromagnetic relays should preferably be capable of actually counting the spaces between successive identical inputs as well as the inputs themselves. If the space or "off" period between successive inputs is not separately registered on the counter, each input will then ordinarily be erroneously registered a plurality of times rather than just once.

In Figs. 1, 3A, 4, and 5, the counters are shown as receiving their inputs from the repetitive operation of an input relay CR. This relay CR is shown normally dropped away so that its front contacts are open. As will be shown, a single digital change involving operation of one counting relay occurs each time that relay CR picks up and also each time that relay CR drops away. In the embodiments of the invention of Figs. 1, 3A, 4, and 5, six counting relays are shown and these are capable of being operated to $2^6$ or 64 permutations of conditions. If it is considered that each closure of the front contacts of this relay CR constitutes an input to the counter, then the opening of these front contacts and the closure of the back contacts constitutes a space between successive inputs. The 64 different combinations of conditions for the counting relays may thus be considered as making the counter capable of counting 32 successive inputs with the remainder of the counter capacity being used to count the 32 spaces between the successive inputs.

For certain applications, it may be alternately considered that this counter with six relays is capable of counting 64 successive inputs or counts where each input is caused by an operation of relay CR, whether it be the picking up or dropping away of this relay CR. It should, of course, be remembered that a greater or fewer number of relays than six can be used to provide, respectively, more or less counting capacity.

Figure 1:
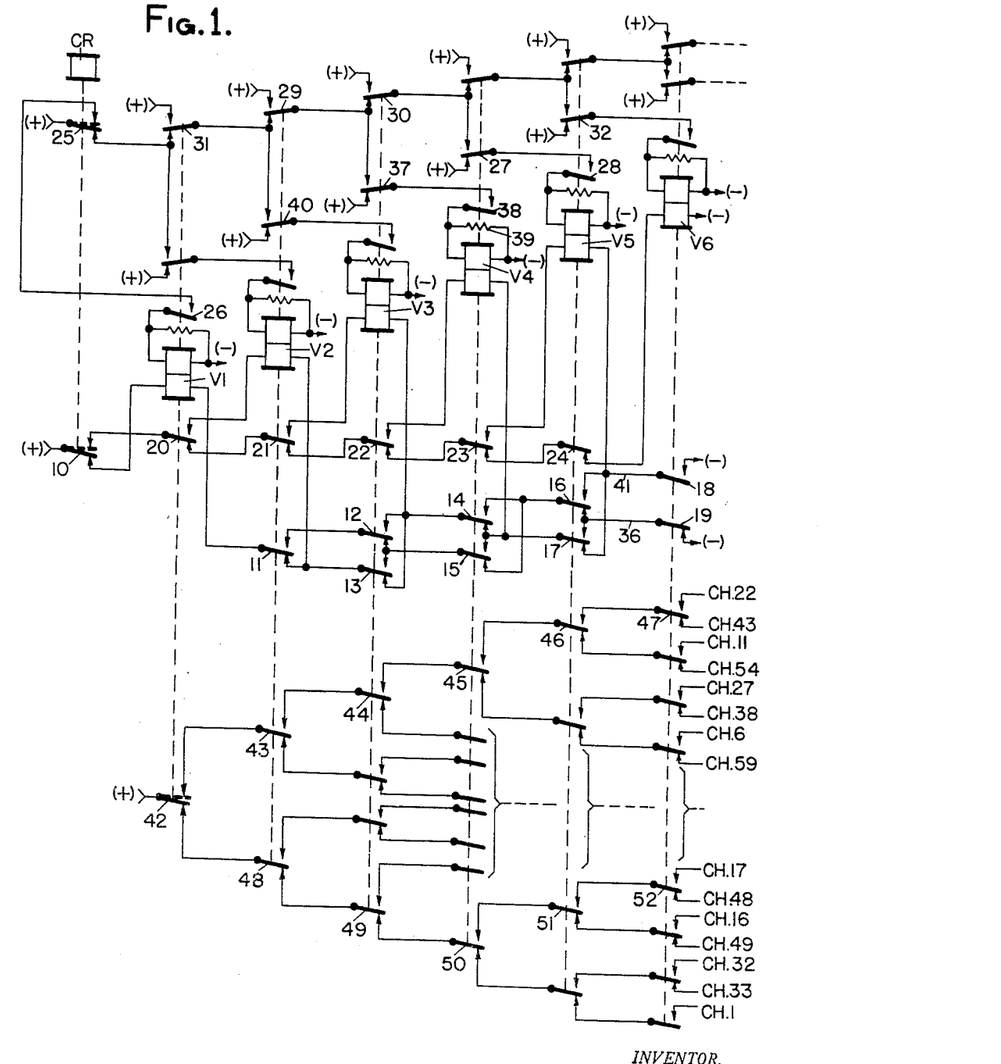
Fig. 1 is a circuit drawing of one embodiment of this invention employing neutral relays which are selectively energized and released.

*Binary counter of Fig. 1*

The binary counter of Fig. 1 includes electromagnetic counting relays of the neutral type each preferably having two windings. The lower winding is in each case controlled to pick the relay up, and the upper winding is a holding or stick winding to maintain the relay picked up when once operated to this condition. The upper stick winding of each counting relay V1 to V6 has a resistor shunting it to provide it with some degree of slow release for purposes which will later become clear.

The pick-up circuit for the first counting relay V1 includes a back contact 10 of the input relay CR, the lower winding of relay V1, and also includes a reiterative network comprising contacts 11 through 19 inclusive of the remaining relays V2 to V6. The pick-up circuit for all the remaining counting relays except the last relay V6 includes the front contact 10 of the input relay CR, back contacts in series of all the relays to the left except for the immediately preceding relay, a front contact of the immediately preceding relay and that portion of the reiterative network comprising only contacts of the relays to the right of the relay in question. For example, the pick-up circuit for relay V3 includes the front contact 10 of the input relay CR, back contact 20 of relay V1, front contact 21 of relay V2, the winding of relay V3, and that portion of the reiterative network that includes the contacts 14 to 19 inclusive of relays V4 to V6 respectively, terminating finally in a connection to the negative terminal of a source of energy denoted by (—).

The pick-up circuit for the last counting relay V6 differs to the extent that it includes back contact 24 of the immediately preceding relay V5 rather than a front contact of this relay. Also, since relay V6 is the relay for the last digit in the code there are no relays for succeeding digits so that the relay V6 pick-up circuit does not include any portion of the reiterative network as do the other relays.

The stick or holding circuit for counting relay V1 includes a front contact 25 of the input relay CR and also a front contact 26 of relay V1. The stick circuit organization for each of the relays V2 to V6, however, comprises either a back contact of the relay for the immediately preceding digit, or a front contact of such for the immediately preceding digit in series with a front contact of any other counting relay for the remaining preceding digits. If all the other counting relays for the remaining preceding digits are dropped away, the stick circuit includes the back contacts in series of all such relays and the back contact 25 of the input relay CR. In other words, a stick circuit is maintained effective for any counting relay after it once picks up except when the relay for the immediately preceding digit is picked up and the relays for the remaining preceding digits are all dropped away. Under this latter condition, the stick circuit will remain effective only as long as relay CR is dropped away. When relay CR picks up in response to an input, the stick circuit is opened and the relay drops away.

When relay V5 is once picked up, for example, it will be held in this condition all throughout the time that relay V4 is dropped away by a circuit which includes (+), back contact 27 of relay V4, front contact 28 of relay V5, and the winding of relay V5 to (—).

If relay V4 is picked up, however, a stick circuit is still established to hold relay V5 picked up if any of the relays for the remaining preceding digits such as relays V1 to V3 are picked up. If relay V2 is picked up, for example, a circuit for holding relay V5 is established and this circuit then extends from (+), and includes the front contact 29 of relay V2, back contact 30 of relay V3, front contact 27 of relay V4, front contact 28 of relay V5, and the winding of relay V5 to (—).

On the other hand, if relay V4 is picked up and relays V1 to V3 are all dropped away, then the establishing of a stick circuit for relay V5 is dependent upon the input relay CR being in a dropped away condition. Under these conditions, a stick circuit is established for relay V5 from (+) which includes back contact 25 of the input relay CR, back contact 31 of relay V1, back contact 29 of relay V2, back contact 30 of relay V3, front contact 27 of relay V4, front contact 28 of relay V5, and the winding of relay V5 to (—).

Figure 2:
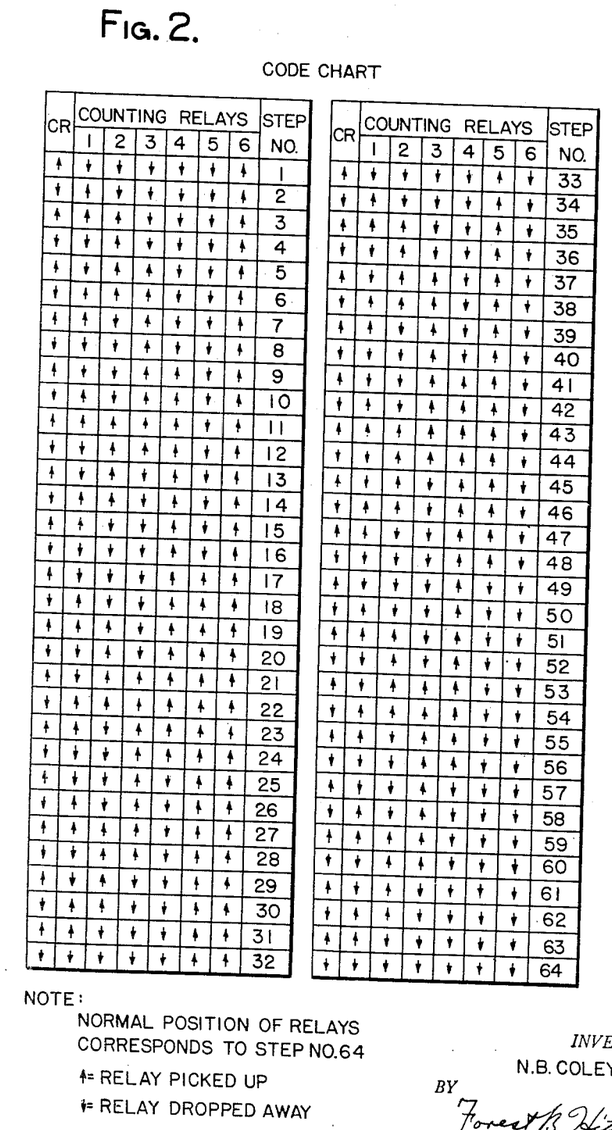
Fig. 2 is a code chart illustrating the operated conditions of the various relays of the counter for the various input counts.

Inspection of the code chart of Fig. 2 shows that the first input applied to the counter when the counting relays are all in their normal dropped away condition must cause relay V6 to pick up. This pick-up circuit is established upon the closure of the front contact 10 of the input relay CR and includes all the back contacts 20 to 24 inclusive of the relays V1 to V5, respectively. Since relay V5 is in its dropped away condition at this time when relay V6 is actuated, a stick circuit is completed through the back contact 32 of relay V5 to hold relay V6 in its picked up condition.

When the input relay CR next drops away, its back contact 10 closes and causes a pick-up circuit for the relay V1 to be closed. This circuit includes, in addition to back contact 10 of the input relay CR, the winding of relay V1, back contact 11 of relay V2, back contact 13 of relay V3, back contact 14 of relay V4, back contact 17 of relay V5, and front contact 18 of relay V6 to (—).

When the input relay CR picks up again, its front contact 25 closes so as to establish a stick circuit for the now picked-up relay V1. At the same time, the closure of front contact 10 of the input relay causes a circuit to be closed through front contact 20 of relay V1, the winding of relay V2, and then through a similar path including the reiterative network just described, terminating finally in a connection to (—) through the closed front contact 18 of relay V6 so that relay V2 also picks up.

Following the description of the operation of the counter of Fig. 1 for the first few inputs, it can now be more readily understood how, in general, the circuit organization shown causes the relays V1 to V6 to be operated in accordance with the code chart of Fig. 2.

The first input which resulted in the picking up of relay V6 occurred in response to the picking up of relay CR. The picking up of relay V1 occurred when the input relay CR dropped away on step No. 2. The code chart in Fig. 2 shows that on all subsequent even-numbered steps, relay V1 is alternately dropped away and picked up. On step No. 4, for example, relay V1 is dropped way; on step 6, relay V1 is picked up; on step 8, relay V1 is once more dropped away, and so on. On all such even-numbered steps, it is the dropping away of the input relay CR that causes relay V1 to operate. For this reason, the pick-up circuit for relay V1 is selectively established through back contact 10 of the input relay CR. It is also for this reason that the stick circuit for relay V1 is interrupted at each even-numbered step by the opening of front contact 25 of the input relay CR so that this relay V1 can be released at the proper even-numbered steps.

The code chart also shows that the picking up of relay V1 occurs only on those particular even-numbered steps when all relays to the right of V1, namely relays V2 to V6, include an odd number of picked-up relays. On the other hand, on all of the even-numbered steps when it is desired that relay V1 drop away, the counting relays to the right of relay V1 include an even number of picked-up relays. On the transfer from step 5 to step 6, for example, relays V2, V3, and V6 are picked up. Thus, at the time that relay V1 is to be picked up on this step 6, three (an odd number) of the five relays V2 to V6 are picked up. In contrast, in going to step 8 when relay V1 is to be released, only relays V3 and V6, an even number of relays, are picked up.

The reiterative network, all or portions of which are included in the pick-up circuit for the relays V1 to V6, makes the selection as to whether relay V1 is to be picked up or released on any even-numbered step as relay CR drops away. The right-hand terminal of the winding of relay V1 is connected through this network to the (—) terminal to complete a pickup circuit for relay V1 only provided that an odd number of the relays V2 to V6 is picked up.

In going from step 5 to step 6, for example, the closure of back contact 10 of the input relay CR occurs, relays V2, V3, and V6 an odd number of relays, is picked up. Under this condition, the right-hand terminal of the winding of relay V1 is connected through front contact 11 of relay V2, front contact 12 of relay V3, back contact 14 of relay V4, back contact 17 of relay V5, and front contact 18 of relay V6, to (—). With its pick-up circuit thus completed, relay V1 is picked up. On the other hand, in going from step 7 to step 8, only relays V3 to V6, an even number of relays, are this time picked up when the back contact 10 of the input relay CR closes. Therefore, the right-hand terminal of the winding of relay V1 is connected through back contact 11 of relay V2, front contact 13 of relay V3, back contact 15 of relay V4, and back contact 16 of relay V5, to the wire 36. This pick-up circuit can now not be completed because of the open back contact 19 of relay V6. Since the stick circuit for relay V6 has already been opened by the opening of front contact 25 of relay CR, relay V1 is released on this step in accordance with the code table of Fig. 2.

The pick-up circuits of the other counting relays V2 to V6 follow circuit paths similar to that provided for relay V1. One difference is that the code chart of Fig. 2 shows that the relays V2 to V6 are picked up and dropped away only on odd-numbered steps when the input relay CR picks up, not on even-numbered steps. For this reason, the pick-up circuits for these relays V2 to V6 include front contact rather than back contact 10 of the input relay CR, and the stick circuits for these relays are at times established through the back contact 25 of the input relay CR so that the proper relay can be released on certain odd-numbered steps when relay CR picks up.

Another difference is that the code chart in Fig. 2 shows that the picking up of any of the relays for the respective binary digits except the last occurs only under the condition in which the relay for the immediately preceding digit is picked up and all other relays for the preceding digits are dropped away. In transferring from step 8 to step 9, for example, relay V4 must be picked up. When the input relay CR picks up in going to step 9, relay V3 is already picked up but relays V2 and V1 are dropped away. For this reason, the pick-up circuit for relay V4 includes a front contact 22 of relay V3 and back contacts 21 and 20 of relays V2 and V1 respectively, as well as the front contact 10 of the input relay CR.

Referring again to Fig. 2, it is shown that another condition fulfilled upon the picking up of relay V4 in going from step 8 to step 9 is that an odd number of relays (only relay V6) for the succeeding digits be in picked-up conditions. As a result, the right-hand terminal of the lower winding of relay V4 is connected through back contact 17 of relay V5 and front contact 18 of relay V6 to the (—) terminal so as to complete the pick-up circuit for relay V4. Thus, it can be seen that one condition that must be fulfilled in picking up any of the counting relays is that an odd number of the relays for the succeeding digits be picked up.

The circuit conditions that are established for the picking up of relays V2 to V6 may be illustrated by another example. Thus, in transferring from step 36 to step 37, it is required that relay V3 pick up. At such time, closure of front contact 10 of the input relay CR occurs at a time when relay V2 is picked up but relay V1 is dropped away. The pick-up circuit for relay V3 is therefore made to include front contact 21 of relay V2 and back contact 20 of relay V1 in addition to the front contact 10 of the input relay CR. The pick-up circuit for relay V3 also includes a portion of the reiterative network involving contacts 14 to 19 inclusive of the relays V4, V5, and V6. This network will allow the right-hand terminal of the lower winding of relay V3 to be connected to the (—) power terminal only when an odd number of these relays V4 to V6 is picked up. In this instance, in going to step 37, only relay V5 is picked up. Under these circumstances, the right-hand terminal of the lower winding of relay V3 is connected through back contact 14 of relay V4, front contact 17 of relay V5, and back contact 19 of relay V6 to (—) so that relay V3 has its pick-up circuit completed and is actuated.

The stick circuits for the relays V1 to V6 hold these relays energized from the time they are picked up until they are to be released. When relay V4 is picked up on step 9, for example, the stick circuit for this relay must be effective to maintain it energized from step 9 until step 25 at which time this relay is released. On step 9, relay V4 is held up by its pick-up circuit. In transferring to step 10, a stick circuit for relay V4 is momentarily established through back contact 25 of the input relay CR, back contact 31 of relay V1, back contact 29 of relay V2, front contact 37 of relay V3, front contact 38 of relay V4, and the upper winding of relay V4, to (—). At the same time, the closure of back contact 10 of the input relay CR causes the counting relay V1 to be picked up. Upon this occurrence, the previously described stick circuit for relay V4 shifts so as to include front contact 31 of relay V1 which is connected directly to (+) rather than the back contact 31 of relay V1 and back contact 25 of the input relay CR which were formerly included in this stick circuit. The slow release characteristics provided for each relay V1 to V6 by the resistor shunting its upper winding such as resistor 39 associated with relay V4 prevent its dropping away when its stick circuit is momentarily opened by the shifting of a contact from one position to the other. Of course, only a very small amount of release time need be provided by each shunting resistor as the stick circuits for the various relays are opened only very briefly.

During counts 11 and 12, relays V3 and V2 are both picked up. The stick circuit for relay V4 then extends from (+), and includes front contact 29 of relay V2, front contact 37 of relay V3, front contact 38 of relay V4, and the upper winding of relay V4 to (—). From counts 13 to 20 inclusive, relay V3 is dropped away so that the stick circuit for relay V4 then includes the back contact 37 of relay V3 which is connected directly to (+). On counts 21 and 22, the relays V2 and V3 are both again picked up so that the stick circuit for relay V4 is the same as on counts 11 and 12. On count 23, relays V1 and V3 are picked up while relay V2 is dropped away. The stick circuit for relay V4 is then the same as that existing on count 10.

On count 24, the stick circuit for relay V4 must again include the back contact 25 of the input relay CR because relays V1 and V2 are dropped away while the relay for the immediately preceding digit, relay V3, is now picked up and the stick circuit then effective is the same that was effective on count 9. In transferring to count 25, the back contact of the input relay CR opens so that the stick circuit for relay V4 is interrupted and this relay then drops away.

The stick circuits for all the remaining relays V2 to V6 are similar to that which has just been described so that it is believed unnecessary to describe how these relays are held energized throughout the various counts in accordance with the code chart of Fig. 2.

In general, it can be said that when any of the counting relays is to be operated, either by being picked up or dropped away, the conditions of the relays for the preceding digits is in both cases the same. For example, when the relay for the third digit, relay V3, is to be picked up on step 37, the situation with respect to the relays for the preceding digits, relays V1 and V2, is that relay V2 for the immediately preceding digit is picked up but relay V1 which corresponds to the remaining preceding digits is dropped away.

On step 44 the same situation prevails with respect to relays V1 and V2. On this step the circuit organization is conditioned to permit the release of relay V3 when the input relay CR next picks up away to start the step 45. On this step, relay V3 is held picked up by a stick circuit which includes the back contact 25 of relay CR, back contact 31 of relay V1, and front contact 40 of relay V2. Thus, it can be seen that when relay CR picks up on step 45, this stick circuit for relay V3 will be opened and this relay will then drop away.

Although the situation with respect to relays V1 and V2 is the same on step 45 that existed on step 37, the pick-up circuit for relay V3 is now not effective. The reason is that the situation with respect to the relays for the succeeding digits is now different than it was on step 37. As previously stated, on step 37 an odd number of relays for the succeeding digits was in picked-up conditions. On step 45, on the other hand, an even number of these relays for the succeeding digits is picked up; namely the relays V4 and V5. Under these circumstances, the right-hand terminal of the lower winding of relay V3 is connected through front contact 14 of relay V4, and front contact 16 of relay V5, to the wire 41 which is now not connected to the power terminal (—) because of the open front contact 18 of relay V6.

Figures 3A, 3B:
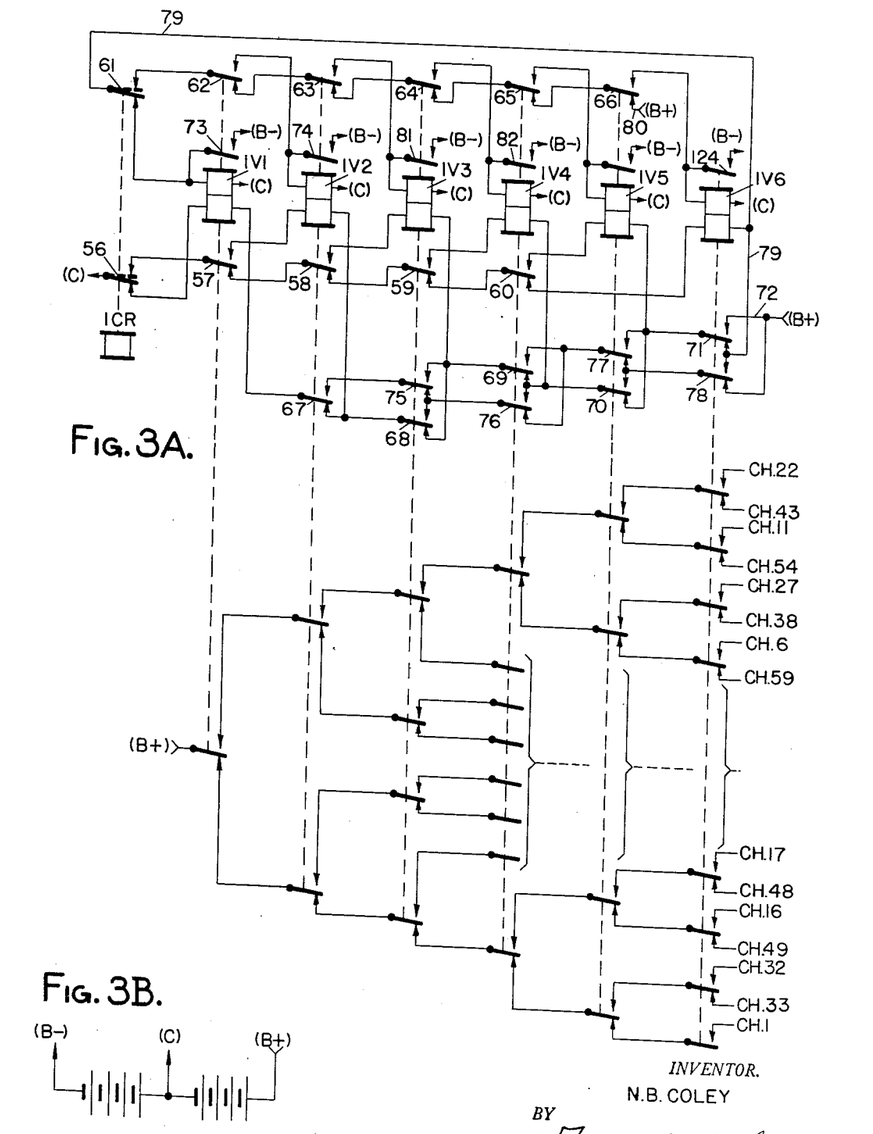
Fig. 3A is a circuit drawing of an embodiment of this invention employing neutral relays which are selectively energized by a split battery with different polarities of direct current.
Fig. 3B indicates the relationship between the designations (B+), (B—), and (C) for the terminals of the split battery used in the embodiments of Figs. 3A and 4.
Figure 4:
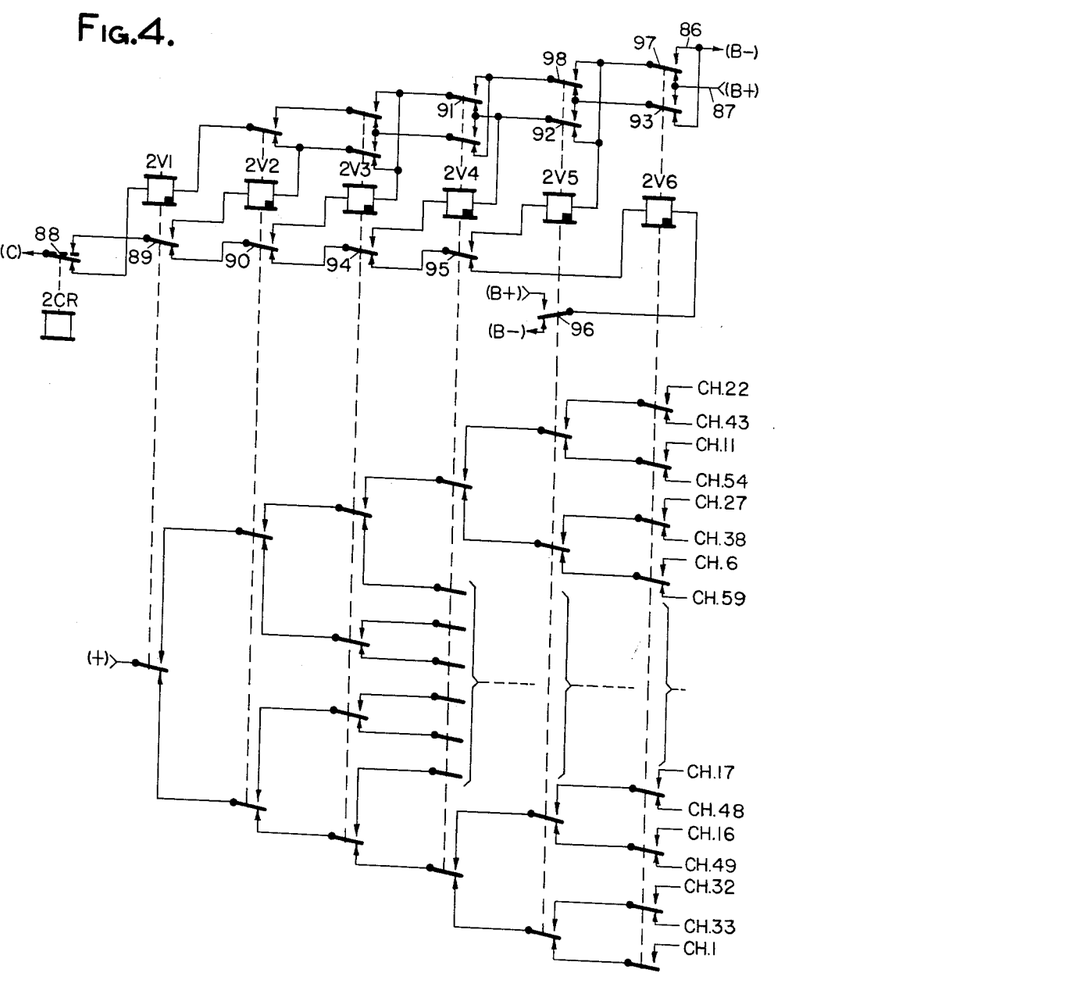
Fig. 4 is a circuit drawing of another embodiment of this invention employing magnetic stick relays.
Figure 5:
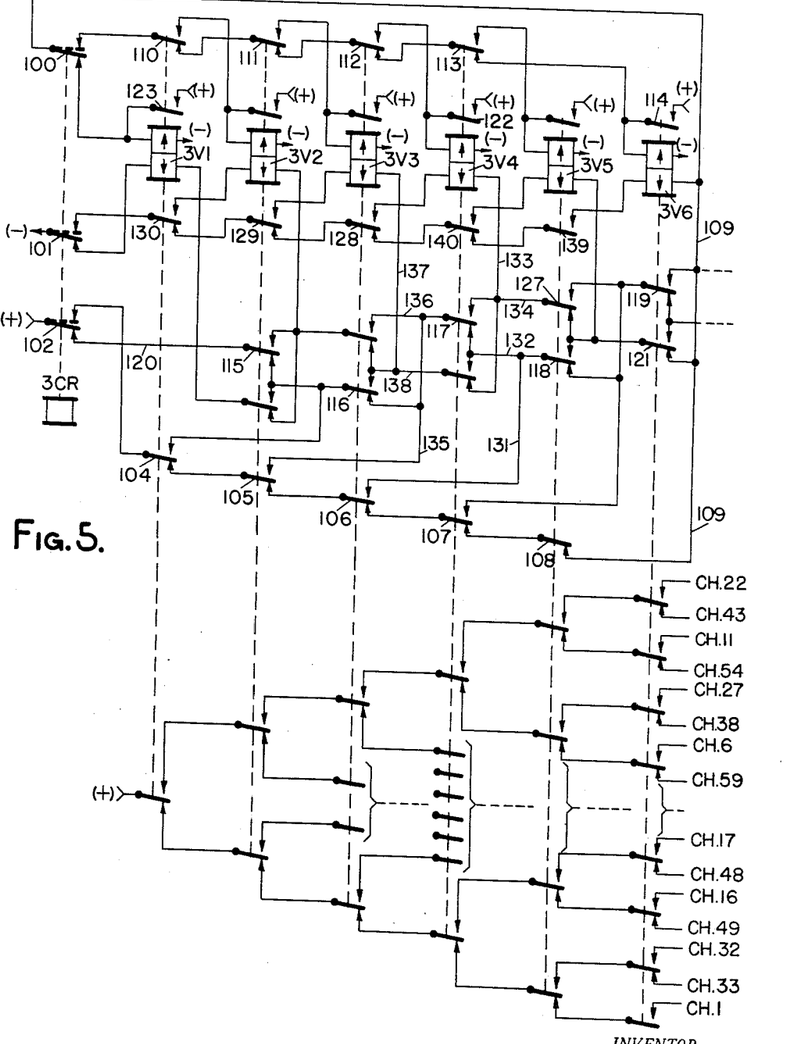
Fig. 5 illustrates an embodiment of this invention employing neutral relays which are actuated selectively between their opposite conditions by different polarities of energization from a single battery.

A representative number of channel circuits have been shown in Fig. 1 and also in Figs. 3A, 4, and 5 to indicate the manner in which circuit selections can be made on the basis of the number of input counts received. In the arrangement shown in Figs. 1, 3A, 4, and 5, a different channel circuit is established each time relay CR picks up and also each time relay CR drops away.

The code chart of Fig. 2 shows that the condition where all the relays V1 to V6 are picked up corresponds to a count of 22. Thus, a circuit is established from (+) and through front contacts 42 to 47 of relays V1 to V6, respectively, to a wire designated CH.22. Similarly, a count of 17 is represented on the code chart by the condition where relays V1 to V3 are all dropped away and relays V4 to V6 are all picked up. Consequently, when the counting relays are in this condition, a circuit may be completed through the back contacts 42, 48, and 49 of the relays V1 to V3 respectively, and through the front contacts 50, 51, and 52 of the relays V4 to V6, respectively, to a wire designated CH.17. In a similar manner a different and distinctive circuit selection may be made for each distinct input count.

Generally a circuit selection is not made for the condition in which all the relays V1 to V6 are dropped away as this represents the normal condition of the various relays before any input counts have been received. When desirable, all the connections for the control of the relays V1 to V6 shown in Fig. 1 as being made to a (+) terminal may instead be made to a common bus which bus is then connected through a normal closed reset contact to the (+) terminal of the energy supply. In this way, opening the reset contact allows all the relays V1 to V6 to release and so restores the counter to its initial or zero condition. This same expedient may also be used in connection with the counters of Figs. 3A, 4, and 5.

*Binary counter of Fig. 3A*

In the embodiment of the invention illustrated in Fig. 3A, neutral relays having two windings are again used for the counting relays. Energization of the lower winding of each relay when it is dropped away causes the relay armature to pick up. The closure of the front contacts causes a stick or holding circuit to be established. The polarity of the magnetomotive force resulting from energization of the upper winding by the stick circuit is such as to aid that applied to the lower winding for picking up of the relay. When the relay is to be released, energy is applied to the lower winding of opposite polarity from that which was used to pick up the relay armature. The magnetomotive force that results from this reverse energization opposes that applied to the upper winding. The flux through the relay core is thus decreased below the drop-away value for the relay so that the relay is released.

As indicated in Fig. 3A, a split battery is provided to make possible the energization of the relay windings with different polarities of current. The terminals (B+) and (B—) are, respectively, of positive and negative polarity with respect to the terminal marked (C) as shown in Fig. 3B.

As with the counter of Fig. 1, each operation of the input relay 1CR causes the picking up or dropping away of one of the counting relays. With all of the relays 1V1 to 1V6 in their normally dropped away conditions, the first picking up of relay 1CR causes a circuit to be established from the terminal (C) of the energy source, through front contact 56 of the 1CR relay, through back contacts 57—60 of the relays 1V1 to 1V4, respectively, the winding of relay 1V6, front contact 61 of relay 1CR, and the back contacts 62 to 66 of relays 1V1 to 1V5, respectively, to the (B+) terminal of the source of energy. When relay 1V6 picks up, a stick circuit is established from (B—), through front contact 124, and the winding of relay 1V6, to the terminal (C). Thus, in accordance with the code chart of Fig. 2, the relay corresponding to the last binary digit is the first to be picked up.

When relay 1CR is again dropped away for the second step, a circuit is completed from the terminal (C) through back contact 56 of the input relay 1CR, the winding of relay 1V1, through back contacts 67 to 70 of the relays 1V2 to 1V5, respectively, and front contact 71 of relay V6 to the power terminal (B+). With relay 1V1 now picked up, it is maintained energized through a stick circuit which extends from (B—), and includes front contact 73 of relay 1V1 and the upper winding of relay 1V1 to the terminal (C).

The contacts 67 to 71 are included in a reiterative network similar to that provided for the binary counter of Fig. 1. This network allows the right-hand terminal of the lower winding of each relay to be connected to wire 72 and to the terminal (B+) only under the condition where an odd number of the relays for the succeeding digits is picked up.

When relay 1CR again picks up for the third step, a circuit is completed from the terminal (C), and through front contact 56 of relay 1CR, front contact 57 of relay 1V1, the winding of relay 1V2, and through that portion of the reiterative network which includes contacts 68 to 71 of the relays 1V3 to 1V6. Since an odd number of these relays 1V3 to 1V6 (in this case only relay 1V6) is picked up, the right-hand terminal of the lower winding of relay 1V2 is connected to the (B+) power terminal so that this lower winding is energized. Upon picking up, a stick circuit for this relay 1V2 is completed through its closed front contact 74.

On transferring to the fourth step, the relay 1CR drops away and closes its back contacts 56 and 61. This provides a circuit from the terminal (C) and through the winding of relay 1V1, the front contact 67 of relay 1V2, back contacts 75, 76 and 77 of the relays 1V3 to 1V5, respectively, front contacts 78 of relay 1V6, wire 79, back contact 61 of relay 1CR, and front contact 73 of relay V1 to the terminal (B—). As a result, the lower winding of relay 1V1 is again energized but this time with a polarity of current that is the reverse of that which was applied in order to pick the relay up. With the magnetomotive force provided by the upper stick winding being, in effect, concelled by the energization now applied to the lower winding of this relay, the relay 1V1 drops away. As soon as its front contact 73 opens, the energization to both windings is removed so that it will not again be picked up.

Following this description of the binary counter of Fig. 3A for the first few steps, the general manner of operation becomes more readily apparent. Since the operation of the counting relays 1V1 to 1V6 follows the same sequence as that followed by the counter of Fig. 1, the circuit means provided for the picking up of the various relays is also similar. The pick-up circuit for relay 1V1 includes a back contact 56 of the input relay 1CR; whereas, the pick-up circuits for the relays 1V2 to 1V6 include the front contact 56 of this relay. The pick-up circuits for the relays 1V2 to 1V5 all include in series, in addition to this contact 56 of relay 1CR, a front contact of the relay for the immediately preceding digit and back contacts of the relays for all other preceding digits. This ensures that the picking up of any of the relays 1V2 to 1V5 can occur only under the conditions where the relay for the immediately preceding digit is picked up and all the other relays for the preceding digits are dropped away in accordance with the code chart of Fig. 2.

As with the counter of Fig. 1, the relay corresponding to the last digit, relay 1V6, is the first relay to be picked up. Its pick-up circuit therefore includes back contacts of all the remaining counting relays in series. More specifically, as described, the pick-up circuit for relay 1V6 includes in series back contacts 57 to 60 of relays 1V1 to 1V4 and also back contacts 62 to 66 of relays 1V1 to 1V5 as well as back contacts 56 and 61 of relay 1CR.

The pick-up circuits for the relays 1V1 to 1V5 also include that portion of the reiterative network comprising contacts of the relays corresponding to the succeeding digits. When any of the relays 1V1 to 1V5 is to be picked up, the right-hand terminal of its lower winding is connected through this reiterative network to the wire 72 and thus to the (B+) terminal of the power supply. Only the pick-up circuit for the relay of the last digit, in this case relay 1V6, has the right-hand terminal of the lower winding of the relay connected through the back contacts 62 to 66 of the relays 1V1 to 1V6, respectively, to be finally terminated in a connection to the wire 80 and thus to the (B+) terminal of the power supply.

As was mentioned in the description of the counter of Fig. 1, when any of the counting relays is to be released according to the code chart of Fig. 2, the conditions with respect to the relays for the preceding digits is the same that existed when this relay was to be picked up. But the conditions with respect to the relays for the succeeding digits require that of these relays an even number be picked up when the relay is to be released as compared with an odd number of such relays when the relay is to be picked up.

As previously described, a characteristic of the reiterative network comprising contacts 67 to 71 and 75 to 78 of the relays 1V2 to 1V6 is that this network allows a circuit path to be completed from the right-hand terminal of the lower winding of each relay 1V1–1V5 to wire 72 whenever an odd number of the relays for the succeeding digits is picked up. Another characteristic of this network, as will presently be demonstrated, is to cause a circuit path to be closed from the right-hand terminal of the lower winding of each relay 1V1 to 1V5 to the wire 79 whenever an even number of the relays for the succeeding digits is picked up. The drive-down circuits for the lower windings of the relays 1V1 to 1V5 each include a portion of this reiterative network. As a result, each relay is controlled to its dropped away condition only when the relays corresponding to the succeeding digits includes an even number of relays that are picked up. The drive-down circuit for each of the counting relays also can be completed only when the relay for the immediately preceding digit is picked up and the relays corresponding to the other preceding digits are all dropped away as will be shown.

For example, in transferring from step 24 to step 25 relay 1V4 is required to be dropped away. On step 24, relays 1V1 and 1V2 are dropped away while relay 1V3 is picked up. Also, of the relays for the succeeding digits, an even smaller number of relays, in this case relays 1V5 and 1V6, is picked up. Although relay 1V3 is picked up, energy to drive-down relay 1V4 cannot be applied from (B—) and through the front contact 81 of relay 1V3 because of the open front contact 63 of relay 1V2. Instead, a circuit path is provided from (B—), through front contact 82 of relay 1V4, front contact 64 of relay 1V3, back contact 63 of relay 1V2, back contact 62 of relay 1V1, front contact 61 of relay 1CR, wire 79, front contact 78 of relay 1V6, front contact 70 of relay 1V5, the winding of relay 1V4, front contact 59 of relay 1V3, back contact 58 of relay 1V2, back contact 57 of relay 1V1, and front contact 56 of relay 1CR, to the terminal (C). As a result of this circuit, energy is applied to the lower winding of relay 1V4 of such a polarity as to cause its armature to drop away. As soon as the front contact 82 of relay 1V4 opens, however, this energization is removed as is also the energization of the upper winding so that the relay will not again be picked up by continued energization of either of its windings.

In a manner similar to that described for relay 1V4, all the other relays are released at the proper time in accordance with the code chart of Fig. 2.

Binary counter of Fig. 4

In the embodiment of the invention illustrated in Fig. 4, the coding relays 2V1 to 2V6 are of the magnetic stick type. Energization of the winding of each relay with one polarity causes its armature to pick up. Upon being thus picked up, it remains in this condition because of its magnetic structure even when the energization is removed. When its winding is energized with the opposite polarity of current, the armature is released and remains in that condition when the energization is removed.

The relay binary counter of Fig. 4 follows in its operation the same sequence of relay operations as do the counters of Figs. 1 and 3A. Energization of the winding of relay 2V1 occurs each time that relay 2CR drops away. The right-hand terminal of the winding of relay 2V1 is connected through a reiterative network that includes contacts of the relays 2V2 to 2V6. The picking up or relay 2V1 requires that an odd number of these relays 2V2 to 2V6 be picked up. In that event, the right-hand terminal of the winding of relay 2V1 will be connected through this network to wire 86 and thus to the (B—) terminal of the battery. On the even-numbered steps, when relay 2CR drops away, and provided that there are an even number of the relays 2V2 to 2V6 picked up, the right-hand terminal of the winding of relay 2V1 will be connected through the reiterative network to the wire 87 and thus to the (B+) terminal of the battery. This energization, having the opposite polarity of that which caused relay 2V1 to pick up, will cause relay 2V1 to drop away.

Each of the relays 2V2 to 2V5 can be energized only through front contact 88 of the relay 2CR, through back contacts in series of all the relays for the preceding digits except for the immediately preceding digit, and a front contact of the relay for the immediately preceding digit. This circuit organization thus ensures that each of these relays 2V2 to 2V6 can be energized only under the conditions in which the relay for the digit immediately preceding is picked up and all other relays for preceding digits are dropped away in accordance with the code chart of Fig. 2.

The selection of polarities of energization to the windings of these relays 2V2 to 2V6 depends upon whether an odd or an even number of the relays for the succeeding digits is picked up. When the number of relays for the succeeding digits in picked up conditions is odd, the polarity of energization for the relay winding selected to be energized causes the relay to be picked up in accordance with the code chart of Fig. 2. However, when the number of such relays for the succeeding digits in picked up conditions is even, the reverse polarity of energization is applied to the selected relay causing it to be dropped away.

An example will serve to illustrate how this selection of polarities causes the selective picking up and dropping away of the relays. In transferring from step 36 to step 37, relay 2V3 is required to be picked up according to the code chart of Fig. 2. On step 37, relay 2V2 is picked up but relay 2V1 is dropped away. Also, of the relays 2V4 to 2V6 which correspond to the digits succeeding the third digit, an odd number of these relays (only relay 2V5) is picked up. Thus, when relay 2CR picks up and closes its front contact 88, a circuit is completed from the terminal (C) and including front contact 88 of relay 2CR, back contact 89 of relay 2V1, front contact 90 of relay 2V2, the winding of relay 2V3, back contact 91 of relay 2V4, front contact 92 of relay 2V5, and the back contact 93 of relay 2V6 to the terminal (B—). This polarity of energization of the winding of relay 2V3 causes the armature to pick up.

Relay 2V3 remains in a pick-up condition until step 45 is reached. At that time, relay 2V2 is picked up and relay 2V1 is dropped away so that the condition with respect to these two relays is the same as existed when relay 2V3 was picked up on step 37. With respect to the relays for the succeeding digits, relays 2V4 to 2V6, an even number of these relays (relays 2V4 and 2V5) is now picked up. Consequently, a circuit is completed from the terminal (B+) and including back contact 97 of relay 2V6, front contact 98 of relay 2V5, front contact 91 of relay 2V4, the winding of relay 2V3, front contact 90 of relay 2V2, back contact 89 of relay 2V1, and front contact 88 of relay 2CR, to the terminal (C). The resulting polarity of the energization applied to the winding of relay 2V3 is opposite from that which was applied to pick this relay up so that it is now released.

The relays 2V1 to 2V5 used in this counting circuit organization of Fig. 4 operate in a similar manner so that the step-by-step operation involving all of these relays need not be explained.

The relay for the last binary, relay 2V6 in Fig. 4, is operated only twice when the counter receives a number of inputs equal to its counting capacity. When the first input is received, all the counting relays are in dropped away conditions so that the closing of front contact 88 of relay 2CR causes a circuit to be established that extends from (C), through front contact 88 of relay 2CR, back contacts 89, 90, 94, and 95 of relays 2V1 to 2V4, respectively, the winding of relay 2V6, and back contact 96 of relay 2V5, to the terminal (B—). This polarity of energization of relay 2V6 causes its armature to pick up.

On step 33, relay 2V6 is required to be dropped away according to the code chart of Fig. 2. At the time relay 2CR picks up to initiate step 33, relays 2V1 to 2V4 are dropped away but relay 2V5 is picked up. Consequently, a circuit is completed from (B+), through front contact 96 of relay 2V5, the winding of relay 2V6, back contacts 95, 94, 90, and 89 of relays 2V4 to 2V1, respectively and through front contact 88 of relay 2CR, to the terminal (C). The winding of relay 2V6 is thereby energized with a polarity of current opposite that used to cause pick-up of the armature so that it is now released.

A greater or fewer number of relays than the six shown in Fig. 4, may as well be used. The generally symmetrical nature of the circuits of Fig. 4 indicate how the circuit organization should be modified so as to include either more or less counting relays. The channel circuits shown merely represent a few of the possible combinations. As with the counter of Fig. 1, a separate channel may be considered as being established upon each dropping away and picking up of the input relay 2CR, as was assumed in designating the numbers of the channels shown in Figs. 1, 3A, 4, and 5 or it may be considered that a new channel circuit is formed only upon each cycle of operation of the relay 2CR such as upon each closure of its front contacts for example.

Binary counter of Fig. 5

In the form of the invention shown in Fig. 5, neutral relays each having two windings are used. Energization of the upper winding of each relay causes it to pick up. A stick circuit including a front contact of each relay and its upper winding is provided to hold each relay picked up upon being controlled to this condition. The lower winding of each relay is, in addition, selectively energized with a current polarity that results in a magnetomotive force opposing that provided for the upper winding by the stick circuit so that energization of the lower winding when the relay is picked up causes the relay armature to drop away. This drive-down of each relay is accomplished through a circuit including a front contact of the relay. Thus, the energization of both the upper and lower windings of the relay is removed when the armature drops away and the relay cannot, therefore, again pick up immediately after its release.

The relays for the various digits in the counter of Fig. 5 are selectively controlled in accordance with the code chart of Fig. 2. On the odd-numbered steps, relay 3CR picks up and causes the selective picking up or dropping away of one of the counting relays 3V2 to 3V6 through front contacts 100, 101, and 102 of the input relay 3CR. Operation of the first counting relay 3V1 occurs on the even-numbered steps and is, therefore, accomplished through the back contacts 100—102 of the input relay 3CR.

The pick-up circuit for relay 3V6 is established upon the first picking up of the input relay 3CR for step No. 1 when all of the counting relays are in their normal dropped-away conditions. This first picking up of relay 3CR causes a circuit to be closed from (+), through front contact 102 of relay 3CR, back contacts 104 to 108 of relays 3V1 to 3V5 respectively, wire 109, front contact 100 of relay 3CR, back contacts 110 to 113 of the relays 3V1 to 3V4, respectively, and the winding of relay 3V6 to (—). As soon as this relay 3V6 picks up, a stick circuit including its own front contact 114 and the upper winding is closed to hold this relay energized.

On the second step, relay 3CR drops away and causes a circuit to be established from (+), through back contact 102 of relay 3CR, back contacts 115 to 118, respectively, of relays 3V2 to 3V5, front contact 119 of relay 3V6 to wire 109, and then through back contact 100 of relay 3CR, and the winding of relay 3V1 to (—). When relay 3V1 picks up, a stick circuit is completed through its front contact 123 to hold it energized.

In order that a closed circuit can be established from the wire 120 to the wire 109, an odd number of the relays 3V2 to 3V6 must be picked up. This condition establishes that the relay 3V1 can pick up only on those The pick-up circuits for the relays 3V2 to 3V5 can all lays for the succeeding digits is picked up in accordance with the code chart of Fig. 2.

The pick-up circuit for the relays 3V2 to 3V5 can all be established only when the relay for the immediately preceding digit is picked up, the relays corresponding to all other preceding digits are dropped away, and an odd number of relays for the succeeding digits is picked up. In transferring from step 40 to step 41, for example, the code chart of Fig. 2 shows that relay 3V4 should be picked up. At that time, the relay 3V3 is picked up and the relays 3V1 and 3V2 are dropped away. Also, an odd number of the relays for the succeeding digits, in this case onl relay 3V5 is picked up. Accordingly, when the input relay 3CR picks up, a circuit is completed from (+), and including front contact 102 of relay 3CR, back contact 104 of relay 3V1, back contact 105 of relay 3V2, front contact 106 of relay 3V3, front contact 118 of relay 3V5, back contact 121 of relay 3V6, wire 109, front contact 100 of relay 3CR, back contact 110 of relay 3V1, back contact 111 of relay 3V2, front contact 112 of relay 3V3, and the upper winding of relay 3V4, to (—). The resulting energization of this upper winding of relay 3V4 causes the relay to pick up. At the same time, a stick circuit is completed through its front contact 122 to hold it energized until such time as a drive-down circuit is established through the lower winding of this relay to cause it to drop away.

When the relay corresponding to a particular digit is to be dropped away, an even number of the relays for the succeeding digits is required to be picked up, according to the code chart of Fig. 2. This is in contrast to the condition existing when that relay is to be picked up because then an odd number of such relays for the succeeding digits is required to be picked up. As previously mentioned, the condition of the relays for the preceding digits is the same when the relay is to be dropped away as when it is to be picked up.

In this embodiment of the invention, the same reiterative network is used in both the pick-up and drive-down circuits for the counting relays. Relay 3V4, for example, is maintained energized by its stick circuit after being picked up on step 41 until the time of transfer from step 56 to step 57. On step 56, relay 3V3 is again picked up and relays 3V1 and 3V2 dropped away, just as when relay 3V4 was picked up. Now, however, an even number of the relays 3V5 to 3V6 is picked up (zero in this case); whereas an odd number of these relays was picked up on step 41.

With this condiiton of the counting relays, a circuit is established from (+) and including front contact 122 of relay 3V4, front contact 112 of relay 3V3, back contact 111 of relay 3V2, back contact 110 of relay 3V1, front contact 100 of relay 3CR, wire 109, back contact 121 of relay 3V6, back contact 127 of relay 3V5, the winding of relay 3V4, front contact 128 of relay 3V3, back contact 129 of relay 3V2, back contact 130 of relay 3V1, and front contact 101 of relay 3CR, (—). As a result of this energization of the lower winding of relay 3V4, this relay is dropped away.

The pick-up circuit for relay 3V4 which became closed on step 41 included wire 131 which is connected to wire 132 of the reiterative network, and also included contacts of relays 3V5 and 3V6 and wire 109. This circuit could be completed only when an odd number of the relays 3V5 and 3V6 (necessarily one in this case) was picked up. The drive-down circuit for relay 3V4 includes wire 133 which connects the right-hand terminal of the lower winding of this relay to wire 134. This connection to wire 134 rather than to wire 132 allows a circuit to be completed to wire 109 only when an even number of the relays 3V5 and 3V6 is picked up.

In a similar way, the pick-up circuit for relay 3V3 includes wire 135 which is connected to wire 136 of the reiterative network. A circuit is completed from this wire 135 to wire 109 only when an odd number of the relays 3V4 to 3V6 is picked up. The drive-down circuit for relay 3V3, however, comprises wire 137 which connects to wire 138 of the reiterative network. A circuit can be completed from wire 137 to wire 109 only when an even number of the relays 3V4 to 3V6 is picked up. In this way, the same reiterative network comprising contacts of the various counting relays can be utilized to secure the selective dropping away and picking up of the various counting relays in accordance with the code chart shown in Fig. 2.

The other counting relays are also dropped away according to the sequence established by the code chart shown in Fig. 2. The drive-down circuit for relay 3V1 differs in that the release of this relay occurs on the even-numbered steps so that its drive-down circuit is established through back contacts 100, 101, and 102 of the input relay 3CR rather than the front contacts. Also, the drive-down circuit for relay 3V6 does not include any portion of the reiterative network. Each counting relay includes in its pick-up and drive-down circuits only that portion of the reiterative network comprising contacts of the relays corresponding to the succeeding digits and relay 3V6 corresponds to the last digit of the code. The drive-down circuit for relay 3V6 is established in transferring to step 33 when relay 3V5 is picked up but the other counting relays 3V1 to 3V4 are dropped away. At that time, a circuit is completed through the front contact 114 of relay 3V6, back contacts 113, 112, 111, and 110 of relay 3V4 to 3V1, respectively, front contact 100 of relay 3CR, wire 109, the winding of relay 3V6, front contact 139 of relay 3V5, back contacts 140, 128, 129, and 130 in series of the relays 3V4 to 3V1, respectively, and the front contact 101 of relay 3CR, to (—).

Having thus described several forms of a binary counter employing relays in which only a single digital change takes place between successive steps of the counter, and in which the relays are successively operated through all permutations of the conditions of said relays, it should be understood that these forms are selected merely to illustrate the principles of this invention, and that adap- tations, alterations, and modifications may be applied to the embodiments shown without departing in any way from the spirit or scope of the invention.

What I claim is:

1. A relay binary counting circuit organization comprising a plurality of electromagnetic relays for respective digits operable to picked up and dropped away conditions and each having a plurality of contacts, circuit means for causing said relays to be operated in succession through all the permutations of conditions for said relays in response to a succession of alternately distinctive inputs, said circuit means being effective to produce operation of only a single one of said relays in response to each of said inputs, means associated with each relay to cause said relay to remain picked up when once controlled to such condition by said circuit means until said relay is to be dropped away upon the occurrence of another input, said circuit means including said contacts being effective to operate the relay corresponding to an intermediate digit to one of its conditions in response to one of said inputs only when the relays for the preceding digits are in a preselected condition and an odd number of the relays for the succeeding digits is picked up, said circuit means including said contacts also being effective to operate said relay corresponding to said intermediate digit to the other of its conditions in response to one of said inputs only when the relays for the preceding digits are in the same preselected condition as when that relay was operated to said one condition and an even number of the relays for the succeeding digits is picked up.

2. A relay binary counting circuit organization comprising, a plurality of electromagnetic relays for respective digits operable to picked up and dropped away conditions and each including a plurality of contacts, circuit means for causing said relays to be operated in succession through all the permutations of conditions for said relays in response to a succession of alternately distinctive input counts, said circuit means being effective to produce operation of only a single one of said relays in response to each of said inputs, means associated with each relay to cause said relay to remain picked up when once controlled to such condition by said circuit means until said relay is to be dropped away upon the occurrence of another input, said circuit means including said contacts being effective to operate the relay corresponding to an intermediate digit to one of its conditions in response to one of said inputs only when the relays for the preceding digits are in the preselected condition wherein the relay for the immediately preceding digit is picked up and the relays for the remaining preceding digits are dropped away and provided further that an odd number of the relays for the succeeding digits is picked up, said circuit means including said contacts also being effective to operate the relay corresponding to said intermediate digit to the other of its conditions in response to one of said inputs only when the relays for the preceding digits are in said preselected condition and an even number of the relays for the succeeding digits is picked up.

3. A relay binary counting circuit organization comprising, a plurality of electromagnetic relays operable to picked up and dropped away conditions and each including a plurality of contacts, means associated with each relay effective when said relay is picked up to maintain said relay in such condition until said relay is to be dropped away upon the occurrence of another input circuit means including said contacts for causing said relays to be operated through all permutations of conditions for said relays in response to a succession of alternately distinctive inputs, said circuit means including said contacts being effective to produce operation of only a single one of said relays in response to each of said inputs, said relay to be operated in response to any input being selected in accordance with the then existing conditions of the other of said relays.

4. A relay binary counting circuit organization for counting a number of alternately distinctive inputs comprising, a plurality of relays each including a plurality of contacts, circuit means including said contacts for selectively picking up and dropping away said relays one at a time in response to each input with only a single relay operation occurring with each input, means associated with each relay effective when said relay is picked up to maintain said relay in such condition until said relay is to be dropped away upon the occurrence of another input, said relay to be operated in response to any input being selected in accordance with the then existing conditions of said relays, and said relays being operated in response to said inputs through all permutations of conditions for said relays successively.

5. A relay binary counting circuit organization comprising, a plurality of electromagnetic relays for respective digits operable to picked up and dropped away conditions and each having a plurality of contacts, circuit means including said contacts for causing said relays to be operated through all permutations of conditions for said relays successively in response to a succession of alternately distinctive inputs, said circuit means being effective to produce operation of only a single one of said relays in response to each of said inputs irrespective of the number of the inputs, means associated with each relay to cause said relay to remain picked up when controlled to such condition until said relay is to be dropped away upon the occurrence of another input, said circuit means being effective to operate the relay corresponding to an intermediate digit to its picked up or dropped away condition only when the relays for the preceding digits are in a preselected condition and an odd or even number of the relays for the succeeding digits is picked up dependent upon whether the relay is to be actuated to its picked up or dropped away condition.

6. In a relay binary counting circuit organization, a plurality of electromagnetic relays each corresponding to a different binary digit of a code having several digits and each having a plurality of contacts, said relays being operable between picked up and dropped away conditions, circuit means including said contacts responsive to respective alternately distinctive inputs to be counted to operate only one of said relays for each of said inputs, said circuit means being effective to pick up the relay corresponding to a particular digit in response to one of said inputs only when the relays for the preceding digits are in a preselected condition and a prescribed number of the relays for the succeeding digits is picked up, and stick circuit means for each relay to hold said relay energized when once picked up until one of said inputs is received at a time when the relays for the preceding digits are again in said preselected condition and a different prescribed number of the relays for the succeeding digits is picked up.

7. In a relay binary counting circuit organization, a plurality of electromagnetic relays each corresponding to a different binary digit of a code having several digits and each including a plurality of contacts, circuit means including said contacts responsive to alternately distinctive inputs to be counted to operate said relays one at a time for the respective inputs, said circuit means including said contacts being effective to pick up the relay corresponding to a particular digit in response to one of said inputs only when an odd number of the relays for the succeeding digits is picked up and the relays for the preceding digits are in the particular condition wherein the relay for the immediately preceding digit is picked up and the relays for the remaining preceding digits are dropped away, stick circuit means for each relay to maintain said relay energized when said relay is picked up, said stick circuit means being effective on the relay for said particular digit until one of said inputs is received at a time when the relays for the preceding digits are again in said particular condition.

8. In a relay binary counting circuit organization, a plurality of relays each having a plurality of contacts and each corresponding to a different binary digit of a code having several code digits, pick-up circuit means including said contacts for selectively picking up said relays in response to a succession of alternately distinctive inputs according to a predetermined sequence, said pick-up circuit means being effective to pick up the relay for any digit except the last in response to an input count only provided that the relay for the immediately preceding digit is picked up while the relays for the remaining preceding digits are all dropped away and that an odd number of relays corresponding to the succeeding digits is picked up, said pick-up circuit means being effected to pick up the relay for the last of said digits only when the relays for all the preceding digits are dropped away, holding means for maintaining said relays picked up when once controlled to such condition, said holding means being effective to selectively release each of said relays in response to an input count only provided that the relay for the immediately preceding digit is picked up while the relays for the remaining preceding digits are dropped away and that an even number of relays corresponding to the succeeding digits is picked up.

9. In a relay binary counting circuit organization, a plurality of relays each having a plurality of contacts and each corresponding to a different binary digit of a code having several code digits, pick-up circuit means for said relays having input circuit means effective to alternately energize first one and then the other of a pair of wires, said pick-up circuit means for said relay corresponding to the first of said digits comprising one of said wires and also including a reiterative network comprising contacts of said relays corresponding to the succeeding of said digits, pick-up circuit means for each of the remaining relays comprising said other wire and the portion of said reiterative network comprising contacts of said relays corresponding to the succeeding of said digits, said pick-up circuit means for each of said relays being effective only when the relay for the immediately preceding digit is picked up and the relays for all other preceding digits are dropped away, said reiterative network being effective to close said pick-up circuit means for any relay corresponding to a particular digit only when the number of relays for the succeeding digits in picked up condition is odd, and stick circuit means for each of said relays to maintain said relays energized when once picked up until said relay is to be dropped away upon the occurrence of another input.

10. In a relay binary counting circuit organization, a plurality of neutral-type relays each having two windings and each corresponding to a different binary digit of a code having several digits, circuit means responsive to alternately distinctive inputs to be counted for operating said relays one at a time for each of said inputs, pick-up circuit means effective to selectively energize one of said windings of each of said relays with one polarity of current in response to one of said inputs only when the relays for the preceding digits are in a preselected condition and an odd number of the relays for the succeeding digits is picked up, stick circuit means for each relay including a front contact of said relay to energize the other of said windings when said relay is picked up, drive-down circuit means including said front contact being effective to selectively energize said one winding of each of said relays with the opposite polarity of current in response to one of said inputs only when the relays for the preceding digits are in said same selected condition and an even number of said relays for the succeeding digits is picked up, whereby said relays are selectively operated one at a time in response to a succession of said inputs through all permutations of the conditions of said relays.

11. A relay binary counting circuit organization comprising, a plurality of neutral-type relays each having two windings and each corresponding to a different binary digit of a code having several digits, circuit means responsive to alternately distinctive inputs to be counted for operating said relays one at a time in response to each input, pick-up circuit means effective to selectively energize one of said windings of each relay with one polarity of current in response to one of said inputs only provided that the relays for the preceding digits are in the selected condition wherein the relay for the immediately preceding digit is picked up and the relays for the remaining preceding digits are dropped away and provided also that an odd number of the relays for the succeeding digits is picked up, stick circuit means for each relay including a front contact of said relay to energize the other of said windings of said relay when said relay is picked up, drive-down circuit means for each of said relays including said front contact being effective to selectively energize said one winding with the opposite polarity of current in response to one of said inputs only when the relays for the preceding digits are in said selected condition and provided further that an even number of the relays for the succeeding digits is picked up, whereby said relays are selectively operated one at a time in response to a succession of said inputs through all permutations of the conditions of said relays.

12. In a relay binary counting circuit organization, a plurality of electromagnetic relays of the magnetic stick type each having a plurality of contacts and each corresponding to a different binary digit of a code having several digits, circuit means responsive to alternately distinctive inputs to be counted to operate said relays one at a time for each of said inputs, said circuit means including said contacts being effective to selectively energize the winding of each of said relays with one polarity of current in response to one of said inputs only when the relays for the preceding digits are in a selected condition and an odd number of said relays for the succeeding digits is picked up to operate said relay to one of its conditions, said circuit means including said contacts also being effective to selectively energize the winding of each of said relays with the opposite polarity of current in response to one of said inputs only when the relays for the preceding digits are in said same selected condition and an even number of the relays for the succeeding digits is picked up to operate said relay to the other of its conditions, said circuit means thereby causing said relays to be operated through all permutations of conditions of said relays in response to a succession of said inputs.

13. In a relay binary counting circuit organization, a plurality of electromagnetic relays each of the magnetic stick type having a plurality of contacts and each corresponding to a different binary digit of a code having several digits, circuit means responsive to alternately distinctive inputs to be counted for operating said relays one at a time for each of said inputs, pick-up circuit means including said contacts effective to selectively energize the winding of each of said relays with one polarity of current in response to one of said inputs only provided that the relays for the remaining digits are in the selected condition wherein the relay for the immediately preceding digit is picked up and the relays for the remaining preceding digits are dropped away and provided further that an odd number of the relays for the succeeding digits is picked up, drive-down circuit means including said contacts effective to selectively energize the winding of each of said relays with the opposite polarity of current in response to one of said inputs only provided that the relays for the preceding digits are in said selected condition and provided further that an even number of the relays for the succeeding digits is picked up, said circuit means thereby being effective to cause said relays to be operated one at a time for each input through all permutations of the conditions of said relays.

14. A relay binary counting circuit organization comprising, a plurality of neutral-type relays each having two windings and each corresponding to a different binary digit of a code having several digits, circuit means responsive to alternately distinctive inputs for operating said relays one at a time in response to each input, pick-up circuit means being effective in response to one of said inputs to energize one of said windings of the relay corresponding to a digit only when the relays for the preceding digits are in a preselected condition and an odd number of the relays for the succeeding digits is picked up, stick circuit means for each relay including a front contact of said relay to energize said one winding when said relay is picked up, drive-down circuit means for each relay including said front contact for energizing the other of said windings of the relay corresponding to any digit in response to one of said inputs only when the relays for the preceding digits are in said preselected condition and an even number of the relays for the succeeding digits is picked up, whereby said relays are selectively operated one at a time in response to a succession of said inputs through all permutations of the conditions of said relays.

15. A relay binary counter comprising, a counting chain of electromagnetic relays each having a plurality of contacts and having only one relay for each digit of a code having several digits, input circuit means operable to form a succession of alternately distinctive inputs, means associated with said relays for causing each of said relays to remain picked up once it has been controlled to such condition by one input from said input circuit means until said relay is to be dropped away upon the occurrence of another input, and means including contacts of said relays for operating said relays selectively to picked up and droped away conditions forming all possible different permutations of conditions of said relays in response to said input circuit means for a succession of inputs, said means for operating said relays being effective to operate but one relay for each input.

16. A relay counting circuit organization comprising a plurality of electromagnetic counting relays each operable to either of two distinctive conditions, input circuit means including externally operated contacts being alternately operated to opposite conditions to form successive input counts, circuit means including said contacts in their one position acting on the first of said counting relays to operate it to one condition when an even number of the succeeding relays is picked up and to the opposite condition when an odd number of the succeeding relays is picked up, circuit means including said contacts in their opposite condition acting to operate to one of said distinctive conditions any counting relay after the first provided that the preceding relays are in a distinctive combination and an odd number of the succeeding relays is picked up and acting to operate to the opposite of said distinctive conditions any counting relay after the first provided that the preceding relays are in said same distinctive combination and an even number of the succeeding relays is picked up, means associated with each relay causing it to remain picked up when once operated to such condition until acted upon by the associated circuit means to be dropped away, said circuit means associated with said first counting relay and said circuit means associated with the remaining counting relays thereby effecting the successive actuation of said relays one at a time to all possible permutations in response to said successive input counts.

References Cited in the file of this patent

UNITED STATES PATENTS

| | | |
|---|---|---|
| 1,563,738 | From | Dec. 1, 1925 |
| 2,067,151 | Dicke | Jan. 5, 1937 |
| 2,116,173 | Judge | May 3, 1938 |
| 2,225,680 | Boswau | Dec. 24, 1940 |
| 2,382,140 | Culbertson | Aug. 14, 1945 |
| 2,389,275 | Rayner | Nov. 20, 1945 |
| 2,561,073 | Schouten | July 17, 1951 |
| 2,636,932 | Oberman | Apr. 28, 1953 |

FOREIGN PATENTS

| | | |
|---|---|---|
| 644,041 | Great Britain | Oct. 4, 1950 |